United States Patent
Ahn et al.

(10) Patent No.: US 7,711,158 B2
(45) Date of Patent: May 4, 2010

(54) METHOD AND APPARATUS FOR CLASSIFYING FINGERPRINT IMAGE QUALITY, AND FINGERPRINT IMAGE RECOGNITION SYSTEM USING THE SAME

(75) Inventors: Do Sung Ahn, Gyeonggi-do (KR); Sung Bum Pan, Daejeon (KR); Kyo Il Chung, Daejeon (KR); Ji Hyun Moon, Incheon (KR); Hak Il Kim, Incheon (KR)

(73) Assignees: Electronics and Telecommunications Research Institute (KR); Inha-Industry Partnership Institute (KR)

( * ) Notice: Subject to any disclaimer, the term of this patent is extended or adjusted under 35 U.S.C. 154(b) by 1227 days.

(21) Appl. No.: 11/260,005

(22) Filed: Oct. 24, 2005

(65) Prior Publication Data

US 2006/0120575 A1  Jun. 8, 2006

(30) Foreign Application Priority Data

Dec. 4, 2004 (KR) .................... 10-2004-0101476
Jun. 1, 2005 (KR) .................... 10-2005-0046679

(51) Int. Cl.
*G06K 9/00* (2006.01)
(52) U.S. Cl. .................. 382/124; 382/115; 382/128
(58) Field of Classification Search .............. 382/124, 382/126, 190, 209, 219
See application file for complete search history.

(56) References Cited

U.S. PATENT DOCUMENTS

| | | | | |
|---|---|---|---|---|
| 5,572,597 | A * | 11/1996 | Chang et al. | 382/125 |
| 6,647,132 | B1 * | 11/2003 | Montillo et al. | 382/108 |
| 6,980,670 | B1 * | 12/2005 | Hoffman et al. | 382/115 |
| 7,035,873 | B2 * | 4/2006 | Weare | 707/104.1 |
| 7,065,416 | B2 * | 6/2006 | Weare et al. | 700/94 |
| 7,072,523 | B2 * | 7/2006 | Bolle et al. | 382/254 |

FOREIGN PATENT DOCUMENTS

| | | |
|---|---|---|
| KR | 1020010000861 A | 1/2001 |
| KR | 1020030019788 A | 3/2003 |
| KR | 1020030040825 A | 5/2003 |
| KR | 1020030076479 A | 9/2003 |

* cited by examiner

*Primary Examiner*—Yosef Kassa
(74) *Attorney, Agent, or Firm*—Blakely, Sokoloff, Taylor & Zafman (57) ABSTRACT

A method and apparatus for classifying fingerprint image quality and a fingerprint image recognition system are provided. The method includes dividing a fingerprint image into a plurality of blocks, calculating and vectorizing quality classification parameters with respect to the respective blocks, obtaining quality classification values for the respective blocks by inputting the vectorized quality classification parameters into a trained quality classifier, and selecting a representative value of the quality classification values and determining the representative value as the quality of the fingerprint image. Since the quality of the fingerprint image can be accurately judged, reliability of the fingerprint image recognition system is increased.

20 Claims, 4 Drawing Sheets

METHOD AND APPARATUS FOR CLASSIFYING FINGERPRINT IMAGE QUALITY, AND FINGERPRINT IMAGE RECOGNITION SYSTEM USING THE SAME

CROSS-REFERENCE TO RELATED PATENT APPLICATIONS

This application claims the benefit of Korean Patent Applications No. 10-2005-046679, filed on Jun. 1, 2005, and No. 10-2004-0101476, filed on Dec. 4, 2004, in the Korean Intellectual Property Office, the disclosures of which are incorporated herein in their entirety by reference.

BACKGROUND OF THE INVENTION

1. Field of the Invention

The present invention relates to a method and apparatus for classifying fingerprint image quality and a fingerprint image recognition system, and more particularly, to a method and apparatus for classifying fingerprint image quality, by which fingerprint image quality is classified using a trained quality classifier and feature information of a fingerprint image, thereby providing a reliable fingerprint image recognition system, and the fingerprint image recognition system using the same.

2. Description of the Related Art

Biometrics is technology of identifying an individual based on the fact that the subject person's physiological or behavioral features different from other persons'. In particular, a fingerprint image recognition system using a fingerprint image is mainly used in the field of biometrics due to accuracy, convenience, a light, thin, simple and small input device, and low cost. Fingerprint image recognition systems have advantages of economical installation cost and reliable security and have been verified with a unique inherent feature of a person based on world wide application cases for several hundred of years. Fingerprint image recognition systems can be made compact and thus provide high mobility and space usability. In particular, since interest in security and private life protection increases with the development of networks, fingerprint image recognition systems are being developed as attractive technology in the field of biometrics. In fingerprint image recognition systems, stability is required particularly in a procedure for registering a user's fingerprint image and is closely related with the performance of a feature information extraction algorithm for the fingerprint image, which is usually influenced by quality information of the fingerprint image very much. Accordingly, a method of accurately classifying the quality information of the fingerprint image will be helpful to find a method of improving the feature information extraction algorithm for the fingerprint image. As a result, the method of improving the feature information extraction algorithm will increase the performance of a fingerprint image recognition system.

However, since only one preprocessing operation is used in most of conventional procedures for extracting feature information from a fingerprint image, fingerprint image quality cannot be accurately classified in conventional technology.

SUMMARY OF THE INVENTION

The present invention provides a method and apparatus for classifying fingerprint image quality by analyzing correlation between fingerprint image recognition and fingerprint image quality in a fingerprint image recognition system.

The present invention also provides a fingerprint image recognition system having a feature information extraction algorithm by which reliable feature information of a fingerprint image is extracted based on the classified fingerprint image quality.

According to an aspect of the present invention, there is provided a method of classifying fingerprint image quality, including dividing a fingerprint image into a plurality of blocks, calculating and vectorizing quality classification parameters with respect to the respective blocks, obtaining quality classification values for the respective blocks by inputting the vectorized quality classification parameters into a trained quality classifier, and selecting a representative value of the quality classification values and determining the representative value as the quality of the fingerprint image.

According to another aspect of the present invention, there is provided an apparatus of classifying fingerprint image quality, including a divider dividing an input fingerprint image into a plurality of blocks, a parameter calculator calculating quality classification parameters with respect to the respective blocks, a vectorizer vectorizing the quality classification parameters of the respective blocks, a classification value acquisition unit obtaining quality classification values for the respective blocks by inputting the vectorized quality classification parameters into a predetermined trained quality classifier, and a quality determiner selecting a representative value of the quality classification values and determining the representative value as the quality of the fingerprint image.

According to still another aspect of the present invention, there is provided a fingerprint image recognition system including a fingerprint image acquisition unit acquiring a fingerprint image of a user, a fingerprint image quality classification unit classifying quality of the fingerprint image, a feature information extraction unit extracting feature information of the fingerprint image using the classified quality of the fingerprint image, and a comparator authenticating the user based on the feature information extracted by the feature information extraction unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings in which like reference numerals denote like elements.

Figure 1:
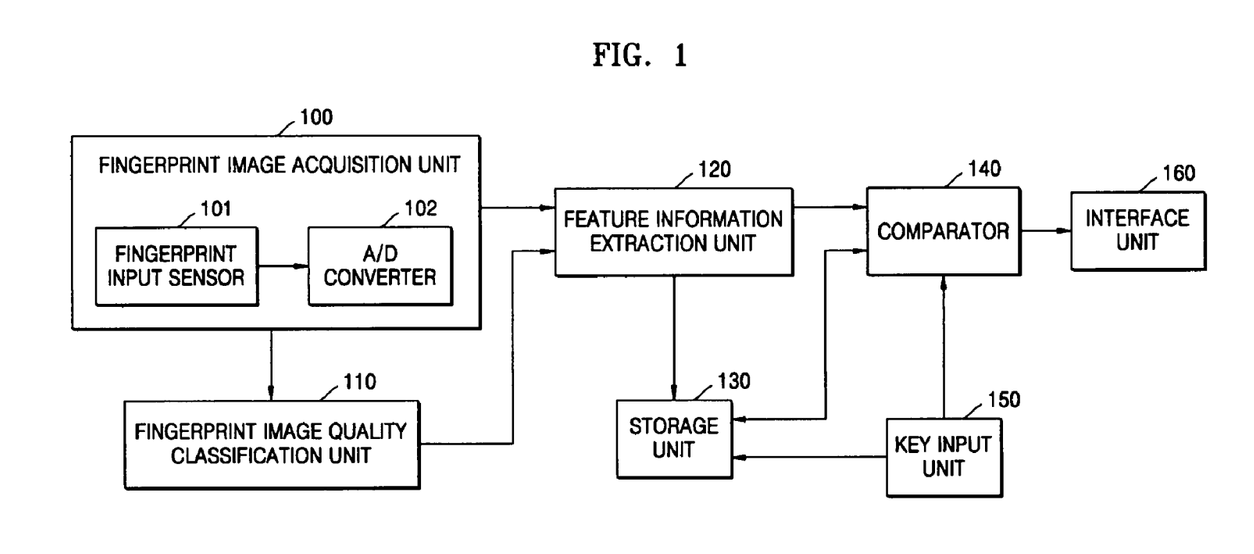
FIG. 1 is a block diagram of a fingerprint image recognition system including an apparatus for classifying fingerprint image quality according to an embodiment of the present invention.

FIG. 1 is a block diagram of a fingerprint image recognition system including an apparatus for classifying fingerprint image quality according to an embodiment of the present invention. The fingerprint image recognition system includes a fingerprint image acquisition unit 100, a fingerprint image quality classification unit 110, a feature information extraction unit 120, a storage unit 130, a comparator 140, a key input unit 150, and an interface unit 160.

The fingerprint image acquisition unit 100 includes a fingerprint input sensor 101 and an analog-to-digital (A/D) converter 102 and acquires a fingerprint image by scanning a user's fingerprint. The fingerprint input sensor 101 scans a user's fingerprint and the A/D converter 102 digitizes the scanned fingerprint, thereby acquiring the user's fingerprint image. The fingerprint image acquisition unit 100 outputs the fingerprint image to the fingerprint image quality classification unit 110 and the feature information extraction unit 120.

The fingerprint image quality classification unit 110 classifies the quality of the fingerprint image received from the fingerprint image acquisition unit 100 and outputs classified fingerprint image quality information to the feature information extraction unit 120.

The feature information extraction unit 120 receives the fingerprint image from the fingerprint image acquisition unit 100 and receives the fingerprint image quality information from the fingerprint image quality classification unit 110. The feature information extraction unit 120 extracts feature information of the fingerprint image using the fingerprint image and the fingerprint image quality information. Here, the feature information indicates a unique feature of the fingerprint image, which is used for user authentication.

The key input unit 150 can input to the comparator 140 identification information of a user needing user authentication in the fingerprint image recognition system. In other words, a user can input user identification information, which proves the identity of the user, to the comparator 140 using the key input unit 150. In addition, when the feature information of the fingerprint image is registered in the storage unit 130, the key input unit 150 may directly input the user identification information to the storage unit 130. In other words, when the feature information of the fingerprint image is registered in the fingerprint image recognition system by storing the feature information in the storage unit 130, the key input unit 150 may input the user identification information to the storage unit 130 via the comparator 140 or directly to the storage unit 130.

Furthermore, when the key input unit 150 directly inputs the user identification information to the storage unit 130, the storage unit 130 extracts feature information of the user's fingerprint image using the user identification information of the user and outputs the feature information to the comparator 140. Then, the comparator 140 compares the feature information received from the storage unit 130 with the feature information received from the feature information extraction unit 120 to perform user authentication.

When registering the feature information of a fingerprint image, the storage unit 130 stores the feature information received from the feature information extraction unit 120 together with the user identification information received from the comparator 140 or the key input unit 150.

The comparator 140 compares the feature information of the fingerprint image received from the feature information extraction unit 120 with feature information stored in the storage unit 130 to perform user authentication. The comparator 140 may directly receive the feature information of the fingerprint image from the storage unit 130. Alternatively, the comparator 140 may receive the user identification information from the key input unit 150 and then download the feature information corresponding to the user identification information from the storage unit 130. Here, the feature information of a fingerprint image is referred to as a template. When the comparator 140 performs comparison, in an alignment stage rotation, translation, and scale are determined with respect to the feature information of a fingerprint image (referred to as an original template) received from the storage unit 130 and the feature information of a fingerprint image (referred to as a matching template) received from the feature information extraction unit 120 so that the two fingerprint images have common coordinate system, origin and scale. Next, in a matching stage the aligned original template is compared with the aligned matching template to determine whether the two templates are obtained from the same fingerprint.

The interface unit 160 is connected with the comparator 140 and transmits and receives information to and from an external device during the comparison performed by the comparator 140.

Figure 2:
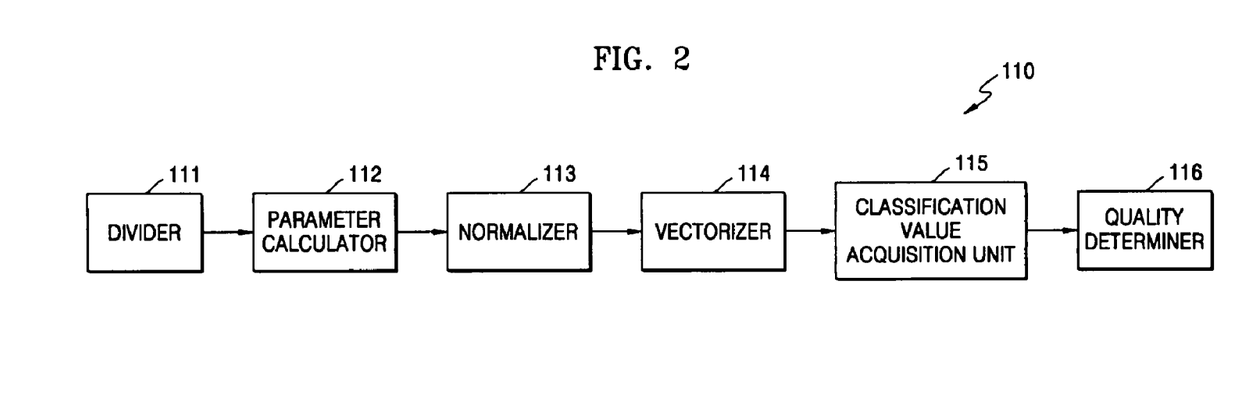
FIG. 2 is a detailed block diagram of a fingerprint image quality classification unit shown in FIG. 1.

FIG. 2 is a detailed block diagram of the fingerprint image quality classification unit 110 shown in FIG. 1. Referring to FIG. 2, the fingerprint image quality classification unit 110 includes a divider 111, a parameter calculator 112, a normalizer 113, a vectorizer 114, a classification value acquisition unit 115, and a quality determiner 116.

The divider 111 segments a fingerprint image received from the fingerprint image acquisition unit 100 into a plurality of blocks. Here, when the divider 111 has a segmented image of a fingerprint region separated from a background region in the fingerprint image, the divider 111 divides only the fingerprint region. However, it will be understood by those skilled in the art of the present invention that the even if the fingerprint region is not separated from the background region, it does not greatly influence the spirit of the present invention in classifying entire fingerprint image quality since the background region is classified as bad in quality.

The parameter calculator 112 calculates a quality classification parameter for a fingerprint image with respect to each of the divided blocks. The quality classification parameter may include at least one among a directional contrast value, a ridge variation distribution value, and a Fourier spectrum value. However, the present invention is not restricted thereto, and in other embodiments of the present invention, various parameters may be used to classify fingerprint image quality. The calculating of the quality classification parameter will be described in detail later.

The normalizer 113 normalizes the quality classification parameter received from the parameter calculator 112 with respect to each of the blocks. Since quality classification parameters calculated for the respective blocks have different ranges, normalization is performed using the normalizer 113 to coincide the ranges of the quality classification parameters with each other.

The vectorizer 114 vectorizes the normalized quality classification parameter received from the normalizer 113 for each block.

The classification value acquisition unit 115 inputs the vectorized quality classification parameter received from the vectorizer 114 for each block into a predetermined trained quality classifier to obtain a quality classification value. The predetermined trained quality classifier is a k-means clustering classifier. A k-means clustering algorithm used in the k-means clustering classifier has been introduced in the field of pattern recognition and is a representative supervised learning algorithm that suggests a class label with respect to an unknown input based on the result of training. In an embodiment of the present invention, the k-means clustering classifier is used, but the present invention is not restricted thereto.

The quality determiner 116 selects a representative value from a plurality of quality classification values obtained by the classification value acquisition unit 115 and determines the representative value as the quality of the fingerprint image received from the fingerprint image acquisition unit 100. In detail, the quality determiner 116 may determine a quality classification value having a maximum frequency among the plurality of quality classification values as the quality of the fingerprint image received from the fingerprint image acquisition unit 100. In an embodiment of the present invention, the quality classification value having the maximum frequency is determined as the quality of the fingerprint image received from the fingerprint image acquisition unit 100, but the present invention is not restricted thereto. The quality determiner 116 may determine the quality of the fingerprint image using other methods.

The fingerprint image quality classification unit 110 having the above-described structure will be described in more detail below.

The divider 111 divides the fingerprint image received from the fingerprint image acquisition unit 100 into H square blocks having N pixels in length and width. The size of the blocks is N×N pixels, but the present invention is not restricted thereto. The blocks may have various lengths and widths in a square or rectangle and is not limited in number.

The parameter calculator 112 calculates a directional contrast value, a ridge variation distribution value, and a Fourier spectrum value with respect to each of the H blocks received from the divider 111. The directional contrast value is a parameter indicating a contrast between a pixel value of a ridge and a pixel value of a valley in a flow direction of the ridge in the fingerprint image. Generally, a fingerprint image in which the flows of a ridge and a valley are clear and the contrast therebetween is distinctive is defined as having good quality. The directional contrast value is calculated using Equation (1).

$$D = |\theta_{max} - \theta_{ortho}|, \quad (1)$$

where $$\theta_{max} = \max\left(\theta_k = \sum_{i=1}^{N}\sum_{j=1}^{N}\sum_{k}(i,j), k = 1, 2, \ldots, 8\right)$$

and $$\theta_{ortho} \perp \theta_{max}$$

where $$\sum_k (i,j) = P_{k1} + P_{k2}$$

The ridge variation distribution value corresponds to the gradient of pixel values and is a parameter from which a direction of a ridge and distribution intensity in the direction can be seen. The ridge variation distribution value is calculated using Equation (2). How intensive the variation distribution is along the ridge direction in a fingerprint image can be inferred from the ridge variation distribution value calculated using Equation (2).

$$L = \frac{\lambda_{min}}{\lambda_{max}} = \frac{(a+b) - \sqrt{(a-b)^2 + 4c^2}}{(a+b) + \sqrt{(a-b)^2 + 4c^2}}, \quad (2)$$

where $$\begin{bmatrix} a & c \\ c & b \end{bmatrix} = E\begin{bmatrix} dx^2 & dxdy \\ dydx & dy^2 \end{bmatrix}, dx = P_{i+1j} - P_{ij},$$

and $$dy = P_{ij+1} - P_{ij}$$

The Fourier spectrum value is calculated using a Fourier spectrum and Fourier transform is known technology. Pixel values on an axis orthogonal to the ridge direction in a fingerprint image can be estimated in a form of a single sine wave. When the energy of the wave is great, the wave is close to the sine wave and the fingerprint image can be classified as having good quality in which a ridge is clearly distinguished from a valley. The Fourier spectrum value can be calculated using Equation (3), in which a reasonable Fourier domain (RFD) is a stable domain that includes neither a maximum frequency band nor a minimum frequency band.

$$F = \max_{\substack{Reasonable \\ Fourier\,domain}} (|f(p,q)|) \quad (3)$$

where $$f(p,q) = \sum_{x=0}^{N-1}\sum_{y=0}^{N-1} e^{-2\pi i \frac{px+qy}{N}} P_{xy} = \text{Re}(p,q) + i\text{Im}(p,q)$$

and $$(|f(p,q)|) = \sqrt{\text{Re}(p,q)^2 + \text{Im}(p,q)^2}$$

In Equation (3), f(p,q) is a Fourier spectrum value at $P_{xy}$ where "p" and "q" are coordinate values in a frequency domain, "Re" indicates a real part of a complex number, "Im" indicates an imaginary part, and the "Reasonable Fourier domain" indicates a band-pass filtering domain applied to the result of the Fourier spectrum and changes according to a distance between ridges in a block of the fingerprint image.

Since the three quality classification parameters calculated for each of the H blocks have different ranges, the normalizer 113 normalizes them. In detail, the normalizer 113 normalizes the three quality classification parameters to a value of 0 through 100.

The vectorizer 114 vectorizes the quality classification parameters normalized to a value of 0 through 100 by the normalizer 113 with a 1*3 vector.

The classification value acquisition unit 115 inputs to the trained k-means clustering classifier the quality classification parameters vectorized by the vectorizer 114 with respect to each of the H blocks to obtain an quality classification value. As described above, the k-means clustering classifier is used in an embodiment of the present invention, but the present invention is not restricted thereto.

In an example of obtaining a quality classification value using the trained k-means clustering classifier, fingerprint image quality is divided into four classes. The k-means clustering classifier expresses the distribution of samples of the four classes in statistical values such as a mean value and a variance value. In other words, clusters for the respective four quality classes are set using the three quality classification parameters, i.e., the directional contrast value, the ridge variation distribution value, and the Fourier spectrum value. Next, a mean vector and a covariance matrix are obtained with respect to each of the four quality clusters. Thereafter, when an image is input, it is determined which of the four quality clusters is most similar to the input image based on the directional contrast value, the ridge variation distribution value, and the Fourier spectrum value obtained from the input image and the mean values and the variance values of the four quality clusters, and the most similar quality cluster is determined as a quality classification value for the input image. To determine the similarity between an input image and a cluster, various methods may be used, but usually formulae based on a Euclidean distance may be used.

The quality determiner 116 determines a quality classification value having a maximum frequency among a plurality of quality classification values, which are received from the classification value acquisition unit 115, as the quality of the fingerprint image received from the fingerprint image acquisition unit 100.

In an embodiment of the present invention, three quality classification parameters and four quality classification values are set. However, more quality classification parameters and more subdivided quality classification values may be set in other embodiments of the present invention.

Figure 3:
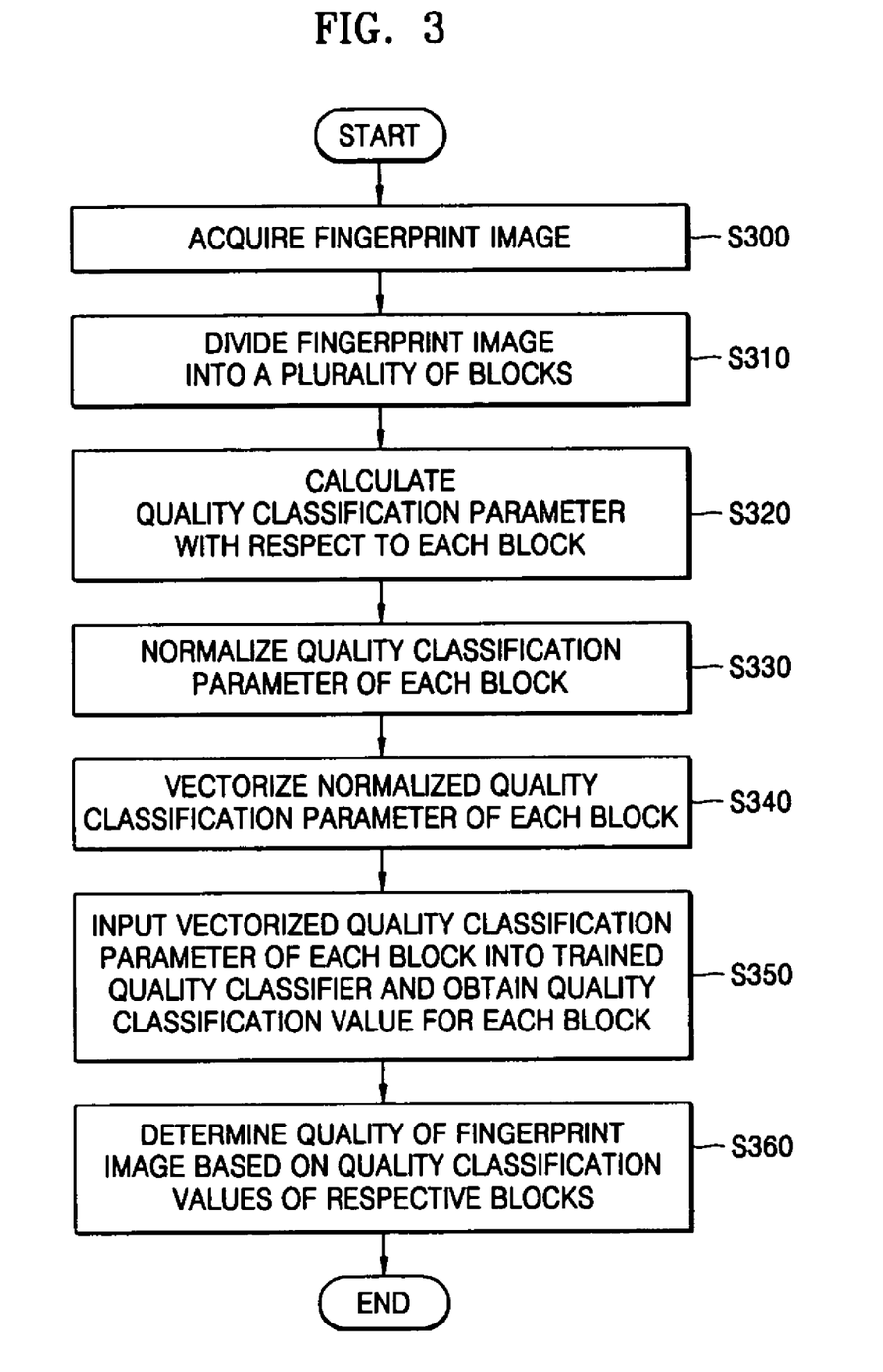
FIG. 3 is a flowchart of a method of classifying fingerprint image quality according to an embodiment of the present invention.

FIG. 3 is a flowchart of a method of classifying fingerprint image quality according to an embodiment of the present invention. In operation S300, a fingerprint image is acquired. In operation S310, the fingerprint image is divided into a plurality of blocks. In operation S320, at least one quality classification parameter is calculated with respect to each of the blocks. At least one among a directional contrast value, a ridge variation distribution value, and a Fourier spectrum value which are obtained with respect to each of the blocks may be used as the quality classification parameter. The calculation of quality classification parameters has been described in detail with reference to FIG. 2 above. Although it has been explained that the quality classification parameter may include at least one among the directional contrast value, the ridge variation distribution value, and the Fourier spectrum value, the present invention is not restricted thereto and various parameters may be used to classify fingerprint image quality in other embodiments of the present invention.

In operation S330, the quality classification parameters of the respective blocks are normalized. Since the quality classification parameters calculated for the respective blocks have different ranges, normalization is performed to accord the ranges of the quality classification parameters of the respective blocks with each other.

In operation S340, the normalized quality classification parameters of the respective blocks are vectorized. In operation S350, the vectorized quality classification parameters are input to a trained quality classifier to obtain quality classification values for the respective blocks. Here, the trained quality classifier is a k-means clustering classifier. A k-means clustering algorithm used in the k-means clustering classifier has been introduced in the field of pattern recognition and is a pattern recognition algorithm that suggests a class label with respect to an unknown input based on the result of training. In an embodiment of the present invention, the k-means clustering classifier is used, but the present invention is not restricted thereto. A procedure for training the k-means clustering classifier and obtaining a quality classification value has been described with reference to FIG. 2 above.

In operation S360, a representative value of the plurality of quality classification values is selected and determined as the quality of the acquired fingerprint image. In detail, a quality classification value having a maximum frequency among the plurality of quality classification values may be determined as the quality of the fingerprint image acquired in operation S300. Descriptions of FIGS. 1 and 2 will be referred to for other details.

Figure 4:
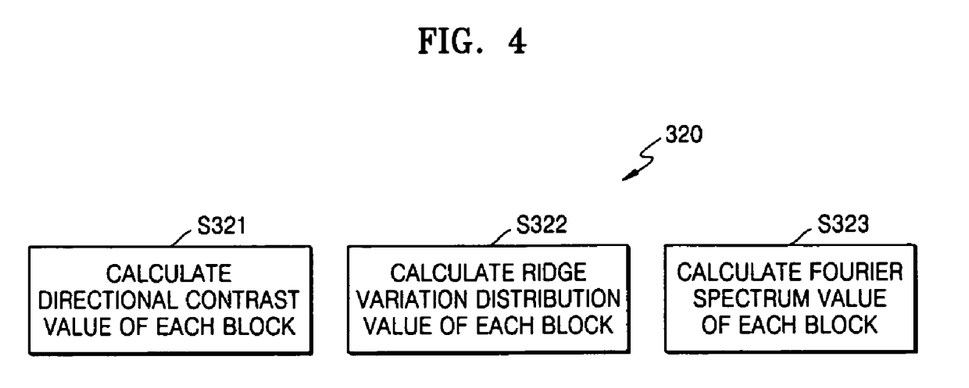
FIG. 4 is a detailed diagram illustrating an operation of calculating quality classification parameters for a fingerprint image in the method shown in FIG. 3.

FIG. 4 is a detailed diagram of operation S320 shown in FIG. 3. Operation S320 may include calculating a directional contrast value as the quality classification parameter with respect to each of the blocks in operation S321, calculating a ridge variation distribution value as the quality classification parameter with respect to each block in operation S322, or calculating a Fourier spectrum value as the quality classification parameter with respect to each block in operation S323. Although operation S320 includes at least one among operations S321, S322, and S323 in an embodiment of the present invention, the present invention is not restricted thereto and various other parameters may be used to classify the quality of the fingerprint image. The calculating of the directional contrast value, the ridge variation distribution value, and the Fourier spectrum value has been described in detail with reference to FIG. 2 above.

Figure 5A:
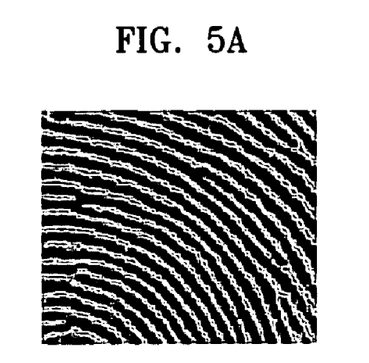
FIGS. 5A through 5D illustrates examples of quality classification values used in the embodiments illustrated in FIGS. 2 and 3.
Figure 5B:
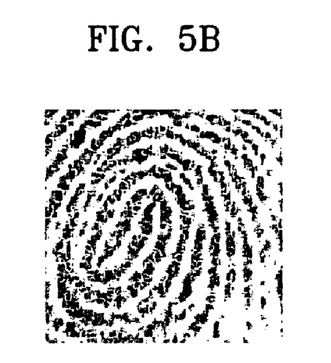
Figure 5C:
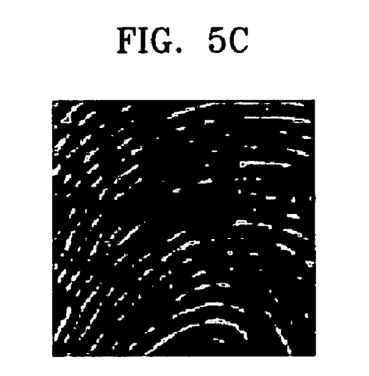
Figure 5D:
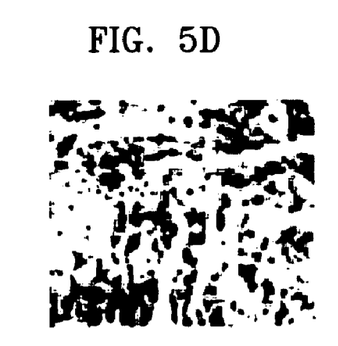

FIGS. 5A through 5D illustrates four quality values determined using the k-means clustering classifier using the three quality classification parameters of an input fingerprint image in the embodiments illustrated in FIGS. 2 and 3. The four quality classification values for a fingerprint image are "good", "dry", "moist", and "bad". FIG. 5A illustrates a fingerprint image having a quality classification value of "good", in which ridges are clear and contrast between a pixel value of a ridge and a pixel value of a valley is distinctive. FIG. 5B illustrates a fingerprint image having a quality classification value of "dry", in which most of a ridge structure can be recognized but an entire image is not clear. FIG. 5C illustrates a fingerprint image having a quality classification value of "moist", in which two parallel ridges are not distinctively shown. FIG. 5D illustrates a fingerprint image having a quality classification value of "bad", in which a ridge structure is completely damaged. Such quality classification is used to determine whether the fingerprint image can be used for fingerprint recognition. In addition, the quality classification may be helpful in selecting and applying appropriate image processing and feature extraction to a fingerprint image which has blocks of various qualities even if having usable image quality as a whole.

Figure 6:
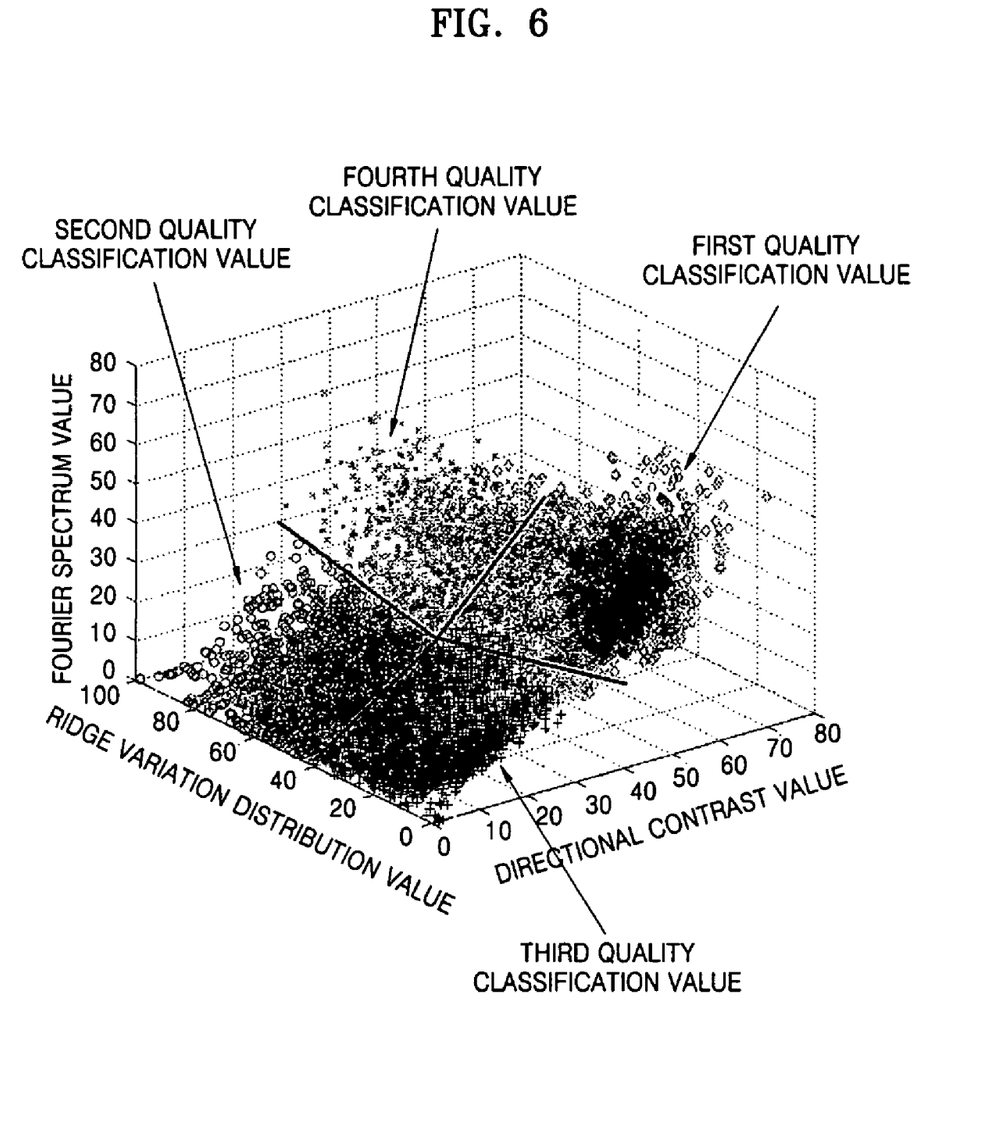
FIG. 6 is a three-dimensional graph of quality classification values obtained according to the embodiments illustrated in FIGS. 2 and 3.

FIG. 6 is a three-dimensional graph of quality classification values obtained according to the embodiments illustrated in FIGS. 2 and 3. In the graph shown in FIG. 6, quality classification values obtained with respect to a fingerprint image according to the embodiments illustrated in FIGS. 2 and 3 are represented in a three-dimensional space having three axes corresponding to three quality classification parameters. Here, the quality classification values are divided into a first quality classification value, a second quality classification value, a third quality classification value, and a fourth quality classification value.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, fingerprint image quality classification recognized as an auxiliary means for extracting feature information from a fingerprint image can provide an effect of accurately judging the quality of the fingerprint image using a quality classification parameter. In addition, since similar results to a result of classification executed by an expert are repeatedly and reliably utilized to obtain feature information of a fingerprint image, optimized performance of a fingerprint image recognition system can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A machine-readable medium that stores executable instructions thereon which, when executed by a machine, cause the machine to perform fingerprint image quality classification operations of: dividing a fingerprint image into a plurality of blocks;
    calculating and vectorizing quality classification parameters with respect to the respective blocks;
    obtaining quality classification values for the respective blocks by inputting the vectorized quality classification parameters into a trained quality classifier; and
    selecting a representative value of the quality classification values and determining the representative value as the quality of the fingerprint image.

2. The machine-readable medium of claim 1, wherein the trained quality classifier is a k-mean clustering classifier.

3. The machine-readable medium of claim 1, wherein the quality classification values are divided into a plurality types of values by the trained quality classifier to classify the quality of each of the blocks.

4. The machine-readable medium of claim 1, wherein the calculating and vectorizing of the quality classification parameters comprises:
    calculating the quality classification parameters with respect to the respective blocks;
    normalizing the quality classification parameters; and
    vectorizing the normalized quality classification parameters.

5. The machine-readable medium of claim 1, wherein the selecting of the representative value comprises selecting as the representative value a quality classification value having a maximum frequency among the quality classification values obtained for the respective blocks.

6. The machine-readable medium of claim 1, wherein the quality classification parameter comprises at least one among:
    a directional contrast value indicating a contrast between a pixel value of a ridge and a pixel value of a valley in a flow direction of ridges in each block of the fingerprint image;
    a Fourier spectrum value of pixel values on an axis orthogonal to a ridge in each block of the fingerprint image; and
    a ridge variation distribution value corresponds to gradient of pixel values along a ridge in each block of the fingerprint image.

7. The machine-readable medium of claim 6, wherein a quality classification value of each block is obtained by defining a plurality of quality clusters used to learn the fingerprint image quality based on distribution of a column vector having the quality classification parameter as an element, obtaining statistical characteristics of the quality clusters, and determining one of the quality clusters as the quality classification value of each block.

8. An apparatus of classifying fingerprint image quality, comprising:
    a divider dividing an input fingerprint image into a plurality of blocks;
    a parameter calculator calculating quality classification parameters with respect to the respective blocks;
    a vectorizer vectorizing the quality classification parameters of the respective blocks;
    a classification value acquisition unit obtaining quality classification values for the respective blocks by inputting the vectorized quality classification parameters into a predetermined trained quality classifier; and
    a quality determiner selecting a representative value of the quality classification values and determining the representative value as the quality of the fingerprint image.

9. The apparatus of claim 8, wherein the trained quality classifier is a k-mean clustering classifier.

10. The apparatus of claim 8, wherein the quality classification values are divided into a plurality types of values by the trained quality classifier to classify the quality of each of the blocks.

11. The apparatus of claim 8, further comprising a normalizer normalizing the quality classification parameters received from the parameter calculator and outputting the normalized quality classification parameters to the vectorizer.

12. The apparatus of claim 8, wherein the quality determiner selects as the representative value a quality classification value having a maximum frequency among the quality classification values of the respective blocks.

13. The apparatus of claim 8, wherein the quality classification parameter comprises at least one among:
    a directional contrast value indicating a contrast between a pixel value of a ridge and a pixel value of a valley in a flow direction of ridges in each block of the fingerprint image;
    a Fourier spectrum value of pixel values on an axis orthogonal to a ridge in each block of the fingerprint image; and
    a ridge variation distribution value corresponds to gradient of pixel values along a ridge in each block of the fingerprint image.

14. The apparatus of claim 13, wherein the classification value acquisition unit obtains a quality classification value of each block by defining a plurality of quality clusters used to learn the fingerprint image quality based on distribution of a column vector having the quality classification parameter as an element, obtaining statistical characteristics of the quality clusters, and determining one of the quality clusters as the quality classification value of each block.

15. A fingerprint image recognition system comprising:
    a fingerprint image acquisition unit acquiring a fingerprint image of a user;
    a fingerprint image quality classification unit classifying quality of the fingerprint image, said fingerprint image quality classification unit including a divider dividing the fingerprint image received from the fingerprint image acquisition unit into a plurality of blocks, and a parameter calculator calculating quality classification parameters with respect to the respective blocks;

a feature information extraction unit extracting feature information of the fingerprint image using the classified quality of the fingerprint image; and a comparator authenticating the user based on the feature information extracted by the feature information extraction unit.

16. The fingerprint image recognition system of claim 15, wherein the fingerprint image quality classification unit comprises:

a vectorizer vectorizing the quality classification parameters of the respective blocks; a classification value acquisition unit obtaining quality classification values for the respective blocks by inputting the vectorized quality classification parameters into a predetermined trained quality classifier; and a quality determiner selecting a representative value of the quality classification values and determining the representative value as the quality of the fingerprint image.

17. The fingerprint image recognition system of claim 15, wherein the fingerprint image acquisition unit comprises:

a fingerprint input sensor scanning a fingerprint of the user; and an analog-to-digital converter converting the users fingerprint into a digital fingerprint image.

18. The fingerprint image recognition system of claim 15, further comprising a storage unit storing in advance feature information of a fingerprint image of a user registered in the fingerprint image recognition system.

19. The fingerprint image recognition system of claim 18, further comprising a key input unit inputting user identification information to the comparator, wherein the comparator downloads the feature information of the fingerprint image stored in the storage unit based on the user identification information and compares the downloaded feature information with the feature information extracted by the feature information extraction unit to authenticate the user.

20. The fingerprint image recognition system of claim 18, further comprising a key input unit inputting user identification information to the storage unit, wherein the storage unit outputs the user identification information received from the key input unit to the comparator, and the comparator compares the feature information received from the storage unit with the feature information received from the feature information extraction unit to authenticate the user.

* * * * *